United States Patent
Liang

(10) Patent No.: US 9,769,027 B2
(45) Date of Patent: Sep. 19, 2017

(54) TOPOLOGY DISCOVERY IN A STACKED SWITCHES SYSTEM

(71) Applicant: Hangzhou H3C Technologies Co., Ltd., Hangzhou (CN)

(72) Inventor: Xuewei Liang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/768,191

(22) PCT Filed: Apr. 21, 2014

(86) PCT No.: PCT/CN2014/075757
§ 371 (c)(1),
(2) Date: Aug. 14, 2015

(87) PCT Pub. No.: WO2014/169855
PCT Pub. Date: Oct. 23, 2014

(65) Prior Publication Data
US 2016/0043902 A1 Feb. 11, 2016

(30) Foreign Application Priority Data
Apr. 19, 2013 (CN) .......................... 2013 1 0138184

(51) Int. Cl.
H04L 12/24 (2006.01)
H04L 12/931 (2013.01)
H04L 12/46 (2006.01)

(52) U.S. Cl.
CPC .......... *H04L 41/12* (2013.01); *H04L 12/4625* (2013.01); *H04L 41/0803* (2013.01); *H04L 49/70* (2013.01)

(58) Field of Classification Search
None
See application file for complete search history.

(56) References Cited

U.S. PATENT DOCUMENTS 6,385,197 B1 * 5/2002 Sugihara ............... H04L 41/046 370/356
8,289,977 B2 * 10/2012 Belanger ................. H04L 49/15 370/254

(Continued)

FOREIGN PATENT DOCUMENTS

| CN | 1665198 | 9/2005 |
| CN | 101141404 | 3/2008 |

(Continued)

OTHER PUBLICATIONS

International Search Report and Written Opinion dated Jul. 15, 2014 issued on PCT Patent Application No. PCT/CN2014/075757 dated Apr. 21, 2014, State Intellectual Property Office, P.R. China.

(Continued)

*Primary Examiner* — Faruk Hamza
*Assistant Examiner* — Cassandra Decker
(74) *Attorney, Agent, or Firm* — Hewlett Packard Enterprise Patent Department

(57) ABSTRACT

According to an example, in a stacked switches system, a member device in a first stack group collects stacking information of the first stack group and identifies a physical topology of the first stack group. Then, the member device collects stacking information of all stack groups in the stacked switches system, and identifies a physical topology of the stacked switches system.

16 Claims, 8 Drawing Sheets

(56) References Cited

U.S. PATENT DOCUMENTS

| | | | | |
|---|---|---|---|---|
| 2006/0092853 | A1* | 5/2006 | Santoso | H04L 45/583 |
| | | | | 370/252 |
| 2007/0036178 | A1 | 2/2007 | Hares et al. | |
| 2008/0301319 | A1* | 12/2008 | Dernosek | H04L 12/66 |
| | | | | 709/232 |
| 2010/0278076 | A1* | 11/2010 | Reddy | H04L 41/0806 |
| | | | | 370/254 |
| 2012/0314581 | A1 | 12/2012 | Rajamanickam et al. | |
| 2014/0301404 | A1* | 10/2014 | Zheng | H04L 1/22 |
| | | | | 370/419 |

FOREIGN PATENT DOCUMENTS

| | | |
|---|---|---|
| CN | 100435524 | 11/2008 |
| CN | 101621466 | 1/2010 |
| CN | 103220234 | 7/2013 |
| EP | 2464062 | 6/2012 |
| EP | 2521309 | 11/2012 |

OTHER PUBLICATIONS

Extended European Search Report, EP Application No. 14785923.5, dated Oct. 19, 2016, pp. 1-8, EPO.

* cited by examiner

TOPOLOGY DISCOVERY IN A STACKED SWITCHES SYSTEM

CLAIM FOR PRIORITY

The present application is a national stage filing under 35 U.S.C 371 of PCT application number PCT/CN2014/075757, having an international filing date of Apr. 21, 2014, which claims priority to Chinese application number 201310138184.3, having a filing date of Apr. 19, 2013, the disclosures of which are hereby incorporated by reference in their entireties.

BACKGROUND

A "stack" refers to a plurality of stackable switching devices that are connected to work together. The stack may provide a large number of ports. The plurality of switching devices forming the stack may be configured to form a virtual device. The virtual device may act as a single switch even though the ports may be distributed among the individual switching devices forming the stack. The virtual device may be referred to as a stacked switches system. Each switching device in the stacked switches system may be referred to as a member device.

BRIEF DESCRIPTION OF THE DRAWINGS

Features of the present disclosure are illustrated by way of example and not limited in the following figure(s), in which like numerals indicate like elements, in which.

DETAILED DESCRIPTION

Hereinafter, the present disclosure will be described in further detail with reference to the accompanying drawings and examples to make the technical solution and merits therein clearer.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, and the term "including" means including but not limited to. The term "based on" means based at least in part on. In addition, the terms "a" and "an" are intended to denote at least one of a particular element.

In various examples of the present disclosure, a stacked switches system may have at least two stack groups, each stack group may include one or multiple member devices. The number of member devices in the stacked switches system is greater than the number of stack groups in the stacked switches system.

Currently, there is not a suitable topology discovery method that may be applied to the stacked switches system having multiple stack groups, which confines the application of the stacked switches system.

Figure 1:
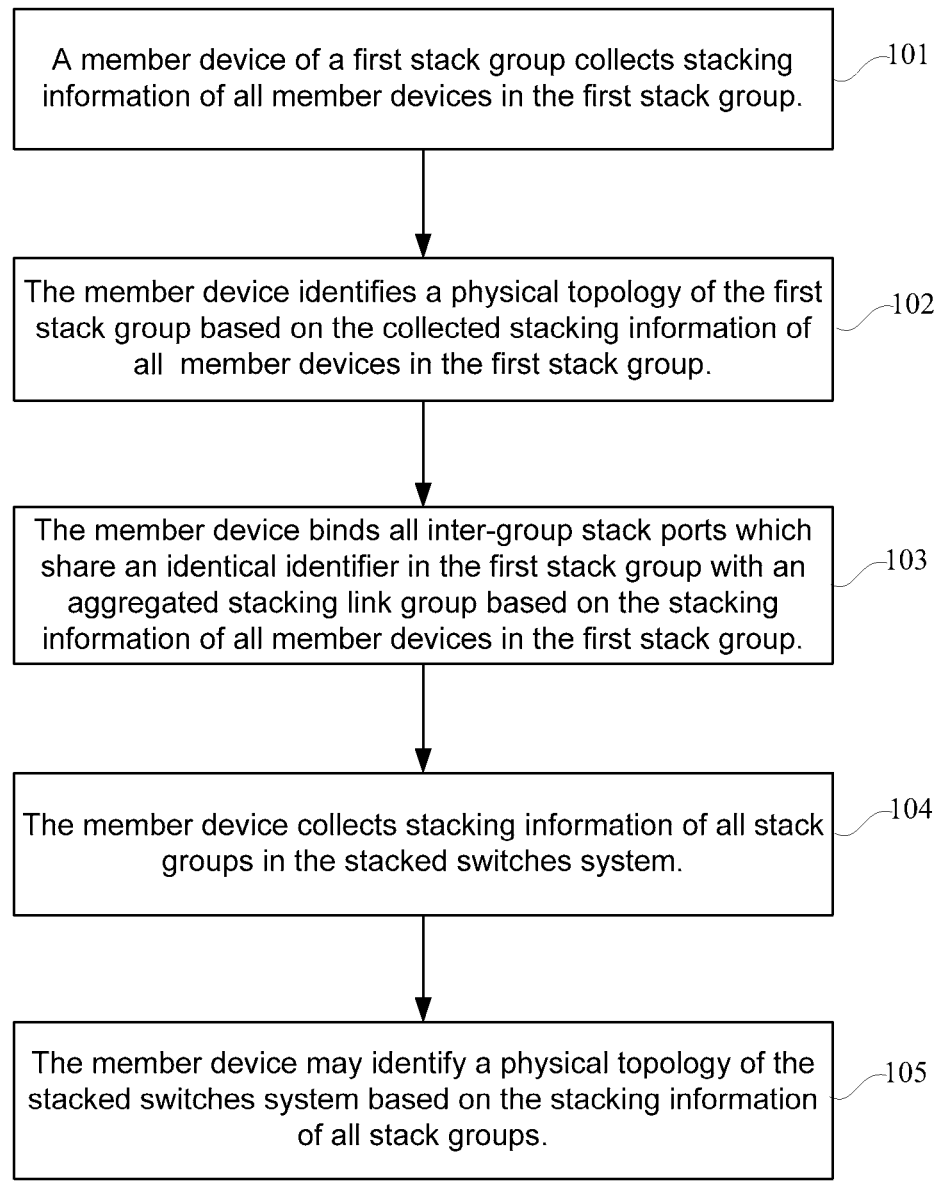
FIG. 1 is a flowchart illustrating a method of topology discovery in a stacking system, according to an example of the present disclosure.

FIG. 1 is a flowchart illustrating a method of topology discovery in a stacked switches system, according to an example of the present disclosure. The stacked switches system may include at least two stack groups and a plurality of member devices, in which the number of the member devices is greater than the number of the stack groups. As shown in FIG. 1, the method may include following operations.

In block 101, a member device in a stack group may collect stacking information of all member devices in the stack group to which it belongs (hereinafter referred to as 'the first stack group').

In block 102, the member device may identify a physical topology of the first stack group based on the collected stacking information of all member devices in the first stack group.

In block 103, the member device may bind all inter-group stack ports which share an identical identifier in the first stack group with an aggregated stacking link group based on the stacking information of all member devices in the first stack group.

In block 104, the member device may collect stacking information of a second stack group in the stacked switches system.

The member device may collect stacking information of the first stack group as well, or may already have stacking information of the first stack group from blocks 101-103. The member device may collect stacking information of other stack groups, if any, so that it has stacking information of all stack groups in the stacked switches system.

In block 105, the member device may identify a physical topology of the stacked switches system based on the stacking information of all stack groups.

A First Example

Figure 2:
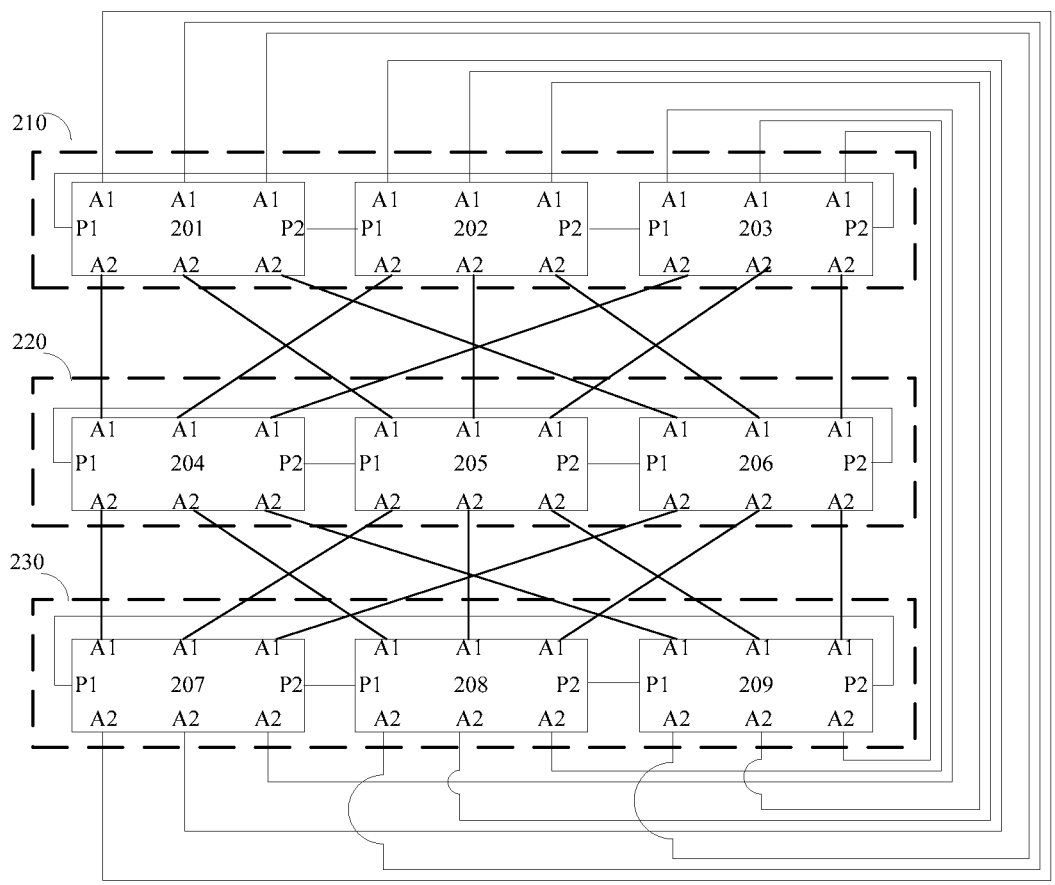
FIG. 2 is a schematic diagram illustrating a stacked switches system, according to an example of the present disclosure.

With reference to a stacked switches system 200 as shown in FIG. 2, in a stack group 210, neighbors of switch 201 are switches 202 and 203, neighbors of switch 202 are the switches 201 and 203, and neighbors of switch 203 are the switches 201 and 202. A first intra-group stack port P1 of the switch 201 may be connected with a second intra-group stack port P2 of the switch 203 using a stacking link. A second intra-group stack port P2 of the switch 201 may be connected with a first intra-group stack port P1 of the switch 202 using a stacking link. A second intra-group stack port P2 of the switch 202 may be connected with a first intra-group stack port P1 of the switch 203 using a stacking link. Based on the same mode, switches 204, 205, and 206 may be connected, using stacking links, to form a stack group 220.

The switches 207, 208, and 209 may be connected, using stacking links, to form a stack group 230.

Two stack groups are adjacent to each other when their member devices are connected with stack links. Referring to FIG. 2 again, the stack group 210 is adjacent to the stack group 230 and the stack group 220, respectively. The stack group 220 is adjacent to the stack group 210 and the stack group 230, respectively. The stack group 230 is adjacent to the stack group 220 and the stack group 210, respectively.

The switches 201 to 209 may respectively include three first inter-group stack ports A1 and three second inter-group stack ports A2.

Three first inter-group stack ports A1 of the switch 201 may respectively be connected, using three stacking links, with a second inter-group stack port A2 of the switch 207, a second inter-group stack port A2 of the switch 208, and a second inter-group stack port A2 of the switch 209. Three second inter-group stack ports A2 of the switch 201 may respectively be connected, using three stacking links, with a first inter-group stack port A1 of the switch 204, a first inter-group stack port A1 of the switch 205, and a first inter-group stack port A1 of the switch 206.

Three first inter-group stack ports A1 of the switch 202 may respectively be connected, using three stacking links, with a second inter-group stack port A2 of the switch 207, a second inter-group stack port A2 of the switch 208, and a second inter-group stack port A2 of the switch 209. Three second inter-group stack ports A2 of the switch 202 may respectively be connected, using three stacking links, with a first inter-group stack port A1 of each of switches 204, 205, and 206.

Three first inter-group stack ports A1 of the switch 203 may respectively be connected, using three stacking links, with a second inter-group stack port A2 of the switch 207, a second inter-group stack port A2 of the switch 208, and a second inter-group stack port A2 of the switch 209. Three second inter-group stack ports A2 of the switch 203 may respectively be connected, using three stacking links, with a first inter-group stack port A1 of the switch 204, a first inter-group stack port A1 of the switch 205, and a first inter-group stack port A1 of the switch 206.

Three second inter-group stack ports A2 of the switch 204 may respectively be connected, using three stacking links, with a first inter-group stack port A1 of the switch 207, a first inter-group stack port A1 of the switch 208, and a first inter-group stack port A1 of the switch 209.

Three second inter-group stack ports A2 of the switch 205 may respectively be connected, using three stacking links, with a first inter-group stack port A1 of the switch 207, a first inter-group stack port A1 of the switch 208, and a first inter-group stack port A1 of the switch 209.

Three second inter-group stack ports A2 of 206 may respectively be connected, using three stacking links, with a first inter-group stack port A1 of the switch 207, a first inter-group stack port A1 of the switch 208, and a first inter-group stack port A1 of the switch 209.

Examples of the present disclosure described later may describe the procedures of collecting, by the switches in each of the stack groups 210, 220, and 230.

The switch 201 may send its stacking information through its intra-group stack ports P1 and P2. Stacking information of the switch 201 may at least include topology information of the switch 201, and valid inter-group stack ports having identifiers A1 and A2 on the switch 201.

The switch 202 may send its stacking information through its intra-group stack ports P1 and P2. Stacking information of the switch 202 may at least include topology information of the switch 202, and valid inter-group stack ports having identifiers A1 and A2 on the switch 202.

The switch 203 may send its stacking information through its intra-group stack ports P1 and P2. Stacking information of the switch 203 may at least include topology information of the switch 203, and valid inter-group stack ports having identifiers A1 and A2 on the switch 203.

The switch 201 may receive, through its intra-group stack port P1, stacking information of the switch 203. The switch 201 may add its stacking information to stacking information of the switch 203 which is received through the intra-group stack port P1 on the switch 201, and send stacking information of the switches 201 and 203 to the switch 202 through the intra-group stack port P2 on the switch 201.

The switch 201 may receive, through its intra-group stack port P2, stacking information of the switch 202. The switch 201 may add its stacking information to stacking information of the switch 202 which is received through the intra-group stack port P2 on the switch 201.

The switch 201 may compare two sets of stacking information respectively received through its intra-group stack ports P1 and P2. The switch 201 may find that stacking information received through its intra-group stack port P1 is originated from the switch 203 and the stacking information received through its intra-group stack port P2 is originated from the switch 202. As such, The switch 201 may determine that the stack group 210 does not complete topology convergence. When the switch 202 receives, through its intra-group stack ports P1 and P2, stacking information of the switches 201 and 203, processing procedures performed by the switch 202 may be the same as those performed by the switch 201, which may be applied to the switch 203, as well. The way for determining, by the switches 202 and 203, that the stack group 210 does not complete the topology convergence may be the same as that of the switch 201, which is not repeated herein.

The switch 201 may receive, through its intra-group stack port P1, stacking information of the switches 202 and stacking information of the switch 203 from the switch 203. The switch 201 may add its stacking information to the stacking information which is received through its intra-group stack port P1, and send to the neighbor switch 202 through its intra-group stack port P2. In this case, the stacking information sent through the intra-group stack port P2 of the switch 201 may include stacking information of the switch 202, stacking information of the switch 203, and stacking information of the switch 201.

The switch 201 may continue to receive, through its intra-group stack port P2, stacking information of the switches 203 and 202 from the switch 202. The switch 201 may add its stacking information to the stacking information which is received through its intra-group stack port P2, and send stacking information of the switches 203, 202, and 201 to the neighbor 203 through its intra-group stack port P1.

The switch 201 may compare two sets of stacking information respectively received through its intra-group stack ports P1 and P2. The switch 201 may find that stacking information received through its intra-group stack port P1 is originated from the switch 202 and the stacking information received through its intra-group stack port P2 is originated from the switch 203. As such, the switch 201 may determine that the stack group 210 does not complete the topology convergence. When the switch 202 receives, through its intra-group stack port, stacking information, processing procedures performed by the switch 202 may be the same as those performed by the switch 201, which may be applied to the switch 203, as well. The way for determining, by the switches 202 and 203, that the stack group 210 does not complete the topology convergence may be the same as that of the switch 201, which is not repeated herein.

The switch 201 may continue to receive, through its intra-group stack port P1, stacking information of the switch 201, stacking information of the switch 202, and stacking information of the switch 203 from the switch 203. The switch 201 may continue to receive, through its intra-group stack port P2, stacking information of the switch 201, stacking information of the switch 203, and stacking information of the switch 202 from the switch 202. The switch 201 may compare two sets of stacking information respectively received through its intra-group stack ports P1 and P2, find both two sets of stacking information include stacking information of the same stack groups and originates from itself, and determine that the stack group 210 completes the topology convergence. The switch 201 may determine, based on the convergent topology, that a physical topology of the stack group 210 may be a ring topology.

The way for determining, by the switch 202 and the switch 203, that the physical topology of the stack group 210 is the ring topology may be the same as that of the switch 201, which is not repeated herein.

Stacking links connected with the first inter-group stack ports A1 of the switches 201, 202, and 203 may be bound with a first aggregated stacking link group of the stack group 210. Stacking links connected with the second inter-group stack ports A2 of the switches 201, 202, and 203 may be bound with a second aggregated stacking link group of the stack group 210. Stacking links connected with the first inter-group stack ports A1 of switches 204, 205, and 206 may be bound with a first aggregated stacking link group of the stack group 220. Stacking links connected with the second inter-group stack ports A2 of switches 204, 205, and 206 may be bound with a second aggregated stacking link group of the stack group 220. Stacking links connected with the first inter-group stack ports A1 of switches 207, 208, and 209 may be bound with a first aggregated stacking link group of the stack group 230. Stacking links connected with the second inter-group stack ports A2 of switches 207, 208, and 209 may be bound with a second aggregated stacking link group of the stack group 230.

According to an example of the present disclosure, the switches 201, 202, and 203 may elect the switch 201 as a master device of the stack group 210 based on stacking information of the switches 201, 202, and 203; the switches 204, 205, and 206 may elect the switch 204 as a master device of the stack group 220 based on stacking information of the switches 204, 205, and 206; the switches 207, 208, and 209 may elect the switch 207 as a master device of the stack group 230 based on stacking information of the switches 207, 208, and 209.

The switch 201 may select, based on a local first principle, one of its inter-group stack ports A1 as a member port of the first aggregated stacking link group of the stack group 210, and one of its inter-group stack ports A2 as a member port of the second aggregated stacking link group of the stack group 210. The switch 201 may send, through the selected inter-group stack port A1, stacking information of the stack group 210 to the neighbor stack group 230, and may send, through the selected inter-group stack port A2, stacking information of the stack group 210 to the neighbor stack group 220. Stacking information of the stack group 210 may at least includes collected stacking information of the switches 201, 202 and 203.

The switch 204 may select, based on the local first principle, one of its inter-group stack ports A1 as a member port of the first aggregated stacking link group of the stack group 220, and one of its inter-group stack ports A2 as a member port of the second aggregated stacking link group of the stack group 220. The switch 204 may send, through the selected inter-group stack port A1, stacking information of the stack group 220 to the neighbor stack group 220, and may send, through the selected inter-group stack port A2, stacking information of the stack group 220 to the neighbor stack group 230. Stacking information of the stack group 220 may at least includes collected stacking information of the switches 204, 205 and 206.

The switch 207 may select, based on the local first principle, one of its inter-group stack ports A1 as a member port of the first aggregated stacking link group of the stack group 230, and one of its inter-group stack ports A2 as a member port of the second aggregated stacking link group of the stack group 230. The switch 207 may send, through the selected inter-group stack port A1, the stacking information of its stack group 230 to the neighbor stack group 220, and may send, through the selected inter-group stack port A2, the stacking information of its stack group 230 to the neighbor stack group 210. Stacking information of the stack group 230 may at least includes collected stacking information of the switches 207, 208 and 209.

The switch 201 may receive stacking information of the stack group 230 through the first aggregated stacking link group of the stack group 210. The switch 201 may add stacking information of the stack group 210 to stacking information of the stack group 230, and send stacking information of the stack groups 230 and 210 through the second aggregated stacking link group of the stack group 210. The switch 201 may receive stacking information of the stack group 220 through the second aggregated stacking link group of the stack group 210. The switch 201 may add stacking information of the stack group 210 to stacking information of the stack group 220, and send stacking information of the stack groups 220 and 210 through the first aggregated stacking link group of the stack group 210.

Then, the switch 201 may receive stacking information of the stack groups 220 and 230 through the first aggregated stacking link group of the stack group 210. The switch 201 may add stacking information of the stack group 210 to stacking information of the stack groups 220 and 230, and send stacking information of the stack groups 220, 230 and 210 to the neighbor stack group 220 through the second aggregated stacking link group of the stack group 210.

The switch 201 may receive stacking information of the stack groups 230 and 220 through the second aggregated stacking link group of the stack group 210. The switch 201 may add stacking information of the stack group 210 to the stack groups 230 and 220, and send stacking information of the stack groups 230, 220 and 210 to the neighbor stack group 230 through the first aggregated stacking link group of the stack group 210.

Then, the switch 201 may receive stacking information of the stack groups 210, 220, and 230 through the first aggregated stacking link group of the stack group 210, and receive stacking information of the stack groups 210, 230, and 220 through the second aggregated stacking link group of the stack group 210.

The switch 201 may compare two sets of the stacking information which are respectively received through the first aggregated stacking link group and the second aggregated stacking link group of the stack group 210, find these two sets of stacking information include the stacking information of same stack groups (i.e., the stack group 220 and the stack group 230) and originates from the stack group 210, and determine that topology of the stacked switches system 200 is converged. The switch 201 may perform topology calculation based on the collected stacking information of all the stack groups 210-230 in the stacked switches system 200, identify that the member devices in the stacked switches system form matrix connections, and determine that a physical topology of the stacked switches system is a matrix topology. The switches 204 and 207 may use the same way as described above to collect the stacking information of all stack groups in the stacked switches system 200 and to determine that the stacked switches system has the matrix topology, which is not repeated herein.

Thereafter, the switches 201, 204, and 207 may elect the stack group 220 as the master stack group of the stacked switches system 200. As such, the switch 204 which is the master device of the stack group 220 may be the master device of the stacked switches system 200, and manage the stacked switches system 200.

According to an example of the present disclosure, when the switch 201 initially sends stacking information of the stack group 210 and finds that it has no inter-group stack port or all its inter-group stack ports are failed, the switch 201 may send stacking information of the stack group 210 to the neighbor switch 202, the switch 202 may send stacking information of the stack group 210 to the neighbor stack group 230 through one of its inter-group stack port A1.

When the inter-group stack port A1 selected by the switch 202 is connected with one of the inter-group stack ports of the switch 208 using a stacking link, the switch 208 may receive stacking information of the stack group 210, and forward stacking information of the stack group 210 to the master device of the stack group 230, i.e., the switch 207. Meanwhile, the switch 208 may send to the switch 207 an identifier of the member port receiving stacking information of the stack group 210 or an identifier of the second aggregated stacking link group to which the member port belongs. The switch 207 may determine that the stacking information forwarded from the switch 208 is received through the second aggegated stacking link group of the stack group 230. Thereafter, the switch 207 may add stacking information of the stack group 230 to the stacking information forwarded from the switch 208, select a member port A1 on the switch 207 from the first aggregated stacking link group of the stack group 230, and may send stacking information of the stack groups 210 and 230 to the neighbor stack group 220 through the selected member port A1.

A Second Example

Figure 3:
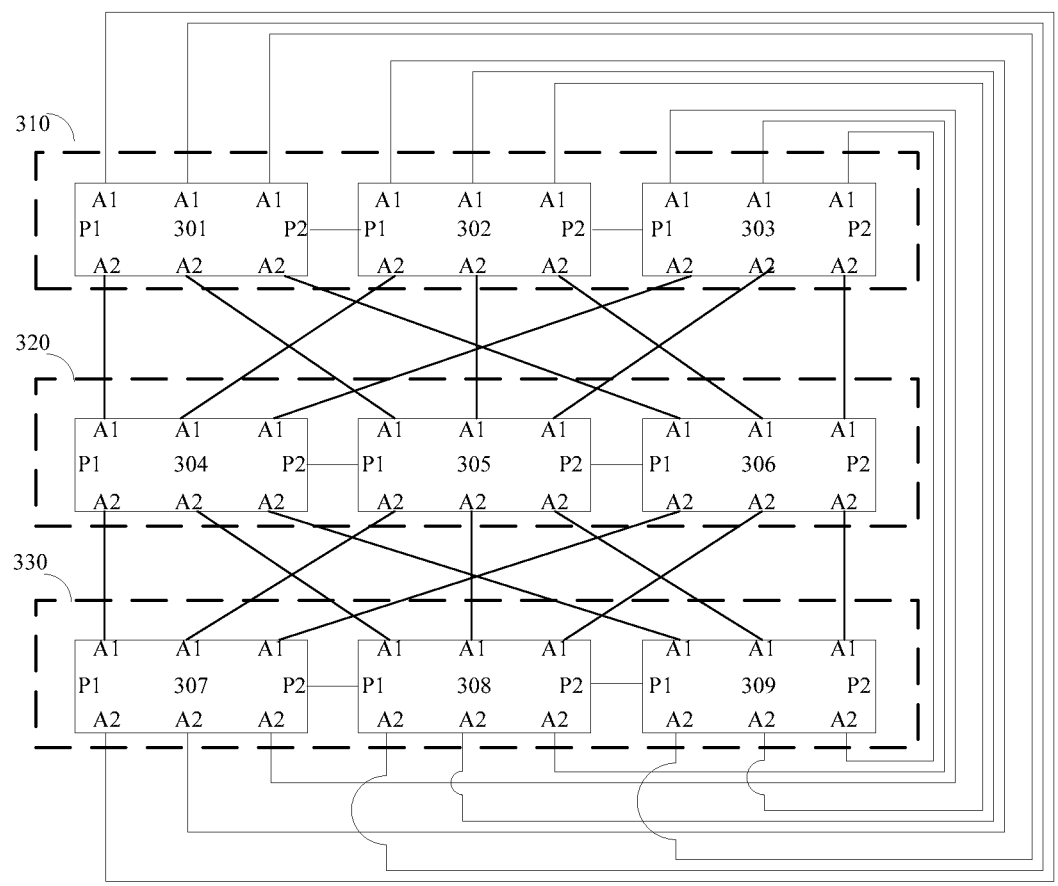
FIG. 3 is a schematic diagram illustrating a stacked switches system, according to an example of the present disclosure.

With reference to a stacked switches system 300 as shown in FIG. 3, first intra-group stack ports P1 of switches 301, 304, and 307 are invalid. Second intra-group stack ports P2 of the switches 303, 306, and 309 are invalid. In a stack group 310, a neighbor of the switch 301 is the switch 302, neighbors of the switch 302 are the switches 301 and 303, and a neighbor of the switch 303 is the switch 302. A second intra-group stack port P2 of the switch 301 may be connected with a first intra-group stack port P1 of the switch 302 via a stacking link. A second intra-group stack port P2 of the switch 302 may be connected with a first intra-group stack port P1 of the switch 303 via a stacking link.

Based on the same mode, the switches 304, 305, and 306 may be connected, using stacking links, to form a stack group 320. The switches 307, 308, and 309 may be connected, using stacking links, to form a stack group 330.

The switches 301 to 309 may respectively include three first inter-group stack ports A1 and three second inter-group stack ports A2. Each first inter-group stack port A1 of the switches 301 to 309 may be connected, using a stacking link, with a second inter-group stack port A2 of each switch in an adjacent stack group.

According to an example of the present disclosure, the switch 301 may send its stacking information through its valid intra-group stack port P2. Stacking information of the switch 301 may include topology information of the switch 301 and valid inter-group stack ports having identifiers A1 and A2 on the switch 301. The switch 302 may send, through its valid intra-group stack ports P1 and P2, its stacking information which may include topology information of the switch 302 and valid inter-group stack ports having identifiers A1 and A2 on the switch 302. The switch 303 may send, through its valid intra-group stack port P1, its stacking information which may include topology information of the switch 303 and valid inter-group stack ports having identifiers A1 and A2 on the switch 303.

The switch 301 may receive, through the valid intra-group stack port P2 on the switch 301, the stacking information sent from the neighbor switch 302. The switch 301 may not forward the received stacking information. The switch 303 may receive, through the valid intra-group stack port P1 on the switch 303, the stacking information sent from the neighbor switch 302. The switch 303 may not forward the received stacking information.

The switch 302 may receive the stacking information from the neighbor switch 301 through its intra-group stack port P1. The switch 302 may add its stacking information to stacking information of the switch 301, and send stacking information of the switches 301 and 302 to the neighbor switch 303 through its intra-group stack port P2. The switch 302 may receive, through its intra-group stack port P2, the stacking information sent from the neighbor switch 303. The switch 302 may add its stacking information to stacking information of the switch 303, and send stacking information of the switches 303 and 302 to the neighbor switch 301 through its intra-group stack port P1.

The switch 301 determines that the stacking information received through its intra-group stack port P2 includes stacking information of the switches 303 and 302 and a configured period of time for collecting topology of the stacking group 210 is expired, the switch 301 may determine that the stack group 310 completes topology convergence. The switch 301 may determine that the stack group 310 may include three member devices and the physical topology of the stack group 310 is the chain topology formed by the three member devices. Before the time for collecting the topology of a stack group reaches the predetermined time point, the switch 301 may determine that the stack group 310 does not complete the topology convergence. Assuming the configured period of time for collecting the topology is expired and the switch 301 only receives the stacking information sent from the switch 302, the switch 301 may determine that the stack group 310 may include two member devices and the physical topology of the stack group 310 is the chain topology formed by the two member devices.

Similarly, when the configured period of time for collecting the topology is expired, the switch 302 may determine that the stack group 310 completes the topology convergence and includes three member devices. Otherwise, the switch 302 may determine that the stack group 310 does not complete the topology convergence. The switch 302 may determine, based on the convergent topology of the stack group 310, that the physical topology of the stack group 310 is the chain topology.

When the configured period of time for collecting the topology is expired, the switch 303 may determine that the stack group 310 completes the topology convergence and includes three member devices. Otherwise, the switch 303 may determine that the stack group 310 does not complete the topology convergence. The switch 303 may determine, based on the convergent topology of the stack group 310, that the physical topology of the stack group 310 is the chain topology.

Stacking links connected with the first inter-group stack ports A1 of the switches 301, the switch 302, and the switch 303 may be bound with a first aggregated stacking link group of the stack group 310. Stacking links connected with the second inter-group stack ports A2 of the switches 301, 302, and 303 may be bound with a second aggregated stacking link group of the stack group 310. Stacking links connected with the first inter-group stack ports A1 of the switches 304, 305, and 306 may be bound with a first aggregated stacking link group of the stack group 320. Stacking links connected with the second inter-group stack ports A2 of the switches 304, 305, and 306 may be bound with a second aggregated stacking link group of the stack group 320. Stacking links connected with the first inter-group stack ports A1 of the switches 307, 308, and 309 may be bound with a first aggregated stacking link group of the stack group 330. Stacking links connected with the second inter-group stack ports A2 of the switches 307, 308, and 309 may be bound with a second aggregated stacking link group of the stack group 330.

According to an example of the present disclosure, the switches 301-303 select the switch 301 as a master device of the stack group 310, the switches 304-306 select the switch 304 as a master device of the stack group 320, and the switches 307-309 select the switch 307 as a master device of the stack group 330.

According to an example of the present disclosure, the master device of each of the stack groups 310, 320, and 330 may use topology discovery mode as described in the aforementioned examples to collect stacking information of the stack groups 210-230, which are not repeated herein.

According to another example of the present disclosure, the master device of each of the stack groups 310, 320, and 330 may collect the stacking information of other stack groups according to a way described as follows.

The switch 301 may select, based on a local first principle, one of its inter-group stack ports A1 as a member port of the first aggregated stacking link group of the stack group 310 and one of its inter-group ports A2 as a member port of the second aggregated stacking link group of the stack group 310. The switch 301 may send, through the selected inter-group stack port A1, stacking information of the stack group 310 to the neighbor stack group 330. The switch 301 may send, through the selected inter-group stack port A2, stacking information of the stack group 310 to the neighbor stack group 320. At this time, a hop count in stacking information of the stack group 310 sent by the switch 301 is 0.

The switch 304 may select, based on the local first principle, one of its inter-group stack ports A1 as a member port of the first aggregated stacking link group of the stack group 320 and one of its inter-group ports A2 as a member port of the second aggregated stacking link group of the stack group 320. The switch 304 may send, through the selected inter-group stack port A1, stacking information of the stack group 320 to the neighbor stack group 310. The switch 304 may send, through the selected inter-group stack port A2, stacking information of the stack group 320 to the neighbor stack group 330. At this time, a hop count in stacking information of the stack group 320 sent by the switch 304 is 0.

The switch 307 in the stack group 330 may select, based on the local first principle, one of its inter-group stack ports A1 as a member port of the first aggregated stacking link group of the stack group 330 and one of its inter-group ports A2 as a member port of the second aggregated stacking link group of the stack group 330. The switch 307 may send, through the selected inter-group stack port A1, stacking information of the stack group 330 to the neighbor stack group 320. The switch 307 may send, through the selected inter-group stack port A2, stacking information of the stack group 330 to the neighbor stack group 310. At this time, a hop count in stacking information of the stack group 330 sent by the switch 307 is 0.

The switch 301 may receive, through the first aggregated stacking link group of the stack group 310, stacking information of the stack group 330 in which the hop count is 0. The switch 301 may increase the hop count in stacking information of the stack group 330 by 1 (i.e., the hop count of the stack group 330 is changed to 1). The switch 301 may add stacking information of the stack group 310 to stacking information of the stack group 330, and may send stacking information of the stack groups 310 and 320 to the neighbor stack group 320 through a member port A2 on the switch 301, in which the member port A2 is selected by the switch 301 from the second aggregated stacking link group of the stack group 310. In this case, in the stacking information sent by the switch 301, the hop count in stacking information of the stack group 330 is 1, and the hop count in stacking information of the stack group 310 is 0.

The switch 301 may receive stacking information through the second aggregated stacking link group of the stack group 310, in which the stacking information may include stacking information of the stack group 320 of which the hop count is 0. The switch 301 may increase the hop count in stacking information of the stack group 320 by 1. The switch 301 may add stacking information of the stack group 310 to stacking information of the stack group 320. The switch 301 may select, based on the local first principle, a member port A1 on the switch 301 from the first aggregated stacking link group of the stack group 310. The switch 301 may send the stacking information of two stack groups (i.e., the stack groups 320 and 310) to the neighbor stack group 330 through the selected member port A1 on the switch 301. In this case, in the stacking information sent by the switch 301, the hop count in stacking information of the stack group 320 is 1, and the hop count in stacking information of the stack group 310 is 0.

The switch 301 may compare two sets of stacking information respectively received through the two aggregated stacking link groups of the stack group 310. The switch 301 may find that both two sets of stacking information are not originate from the stack group 310. As such, the switch 301 may determine that the whole stacked switches system does not complete the topology convergence. Each of the switches 304 and the switch 307 may use the same way as described above to process the stacking information respectively received through the aggregated stacking link groups of the stack group 320 and the stack group 330, and to determine that the whole stacked switches system does not complete the topology convergence, which are not repeated herein.

The switch 301 may receive stacking information through the first aggregated stacking link group of the stack group 310, in which the stacking information may include stacking information of the stack group 320 in which the hop count is 1 and stacking information of the stack group 330 in which the hop count is 0. The switch 301 may increase the hop count in stacking information of the stack group 320 and in stacking information of the stack group 330 by 1 (i.e., the hop count in stacking information of the stack group 320 is changed to 2 and the hop count in stacking information of the stack group 330 is changed to 1). The switch 301 may add stacking information of the stack group 310 to stacking information of the stack groups 320 and 330, and send stacking information of the stack groups 320, 330 and 310 to the neighbor stack group 320 through a member port A2 on the switch 301 In this case, in the stacking information sent by the switch 301 may be presented as stacking information of the stack group 320 of which the hop count is 2, stacking information of the stack group 330 of which the hop count is 1, and stacking information of the stack group 310 of which the hop count is 0.

The switch 301 may receive stacking information through the second aggregated stacking link group of the stack group 310, in which the stacking information may include stacking information of the stack group 330 of which the hop count is 1 and stacking information of the stack group 320 of which the hop count is 0. The switch 301 may increase the hop count in stacking information of the stack group 330 and in stacking information of the stack group 320 by 1 (i.e., the hop count in stacking information of the stack group 330 is changed to 2 and the hop count in stacking information of the stack group 320 is changed to 1). The switch 301 may add, in the front of stacking information of the stack groups 320 and 330 of which values of the hop count are changed, stacking information of the stack group 310 to form new stacking information. The switch 301 may send the new stacking information to the neighbor stack group 330 through a member port A1 on the switch 301, in which the member port A1 is selected by the switch 301 from the first aggregated stacking link group of the stack group 310 according to the local first principle. In the stacking information sent through the inter-group stack port on the switch 301, the hop count in stacking information of the stack group 330 is 2, the hop count in stacking information of the stack group 320 is 1, and the hop count in stacking information of the stack group 310 is 0.

The switch 301 may compare two sets of stacking information respectively received through the two aggregated stacking link groups of the stack group 310. The switch 301 may find that both two sets of stacking information are not originate from the stack group 310. As such, the switch 301 may determine that the whole stacked switches system does not complete the topology convergence. Each of the switches 304 and the switch 307 may use the same way as described above to process the stacking information respectively received through the aggregated stacking link groups of the stack groups 320 and 330, and to determine that the whole stacked switches system does not complete the topology convergence, which are not repeated herein.

The switch 301 may continue to receive stacking information through the first aggregated stacking link group of the stack group 310, in which the stacking information may include stacking information of the stack group 310 in which the hop count is 2, stacking information of the stack group 320 in which the hop count is 1, and stacking information of the stack group 330 in which the hop count is 0. The switch 301 may continue to receive stacking information through the second aggregated stacking link group of the stack group 310, in which the stacking information may include stacking information of the stack group 310 of which the hop count is 2, stacking information of the stack group 330 of which the hop count is 1, and stacking information of the stack group 320 of which the hop count is 0. The switch 301 may compare two sets of stacking information respectively received through the two aggregated stacking link groups of the stack group 310. The switch 301 may find that stacking information of the first stack group in each of the two sets of stacking information originate from the stack group 310, and the two sets of the stacking information include stacking information of the same stack groups. The switch 301 may further find that the stacking information of each stack group in the two sets of stacking information includes the first aggregated stacking link group and the second aggregated stacking link group. As such, the switch 301 may determine that the whole stacked switches system completes the topology convergence. The switch 301 may determine, based on the stacking information of all stack groups in the stacked switches system, that a physical topology of the stacked switches system is a matrix topology. The way for determining, by the switch 304 in the stack group 320 and the switch 307 in the stack group 330, that the physical topology of the stacked switches system is the matrix topology may be the same as that of the switch 301, which is not repeated herein. Thereafter, the switches 301, the switch 304, and the switch 307 may elect a master stack group of the stacked switches system. A master device of the master stack group may be configured as a master device of the stacked switches system to manage the whole stacked switches system.

A Third Example

Figure 4:
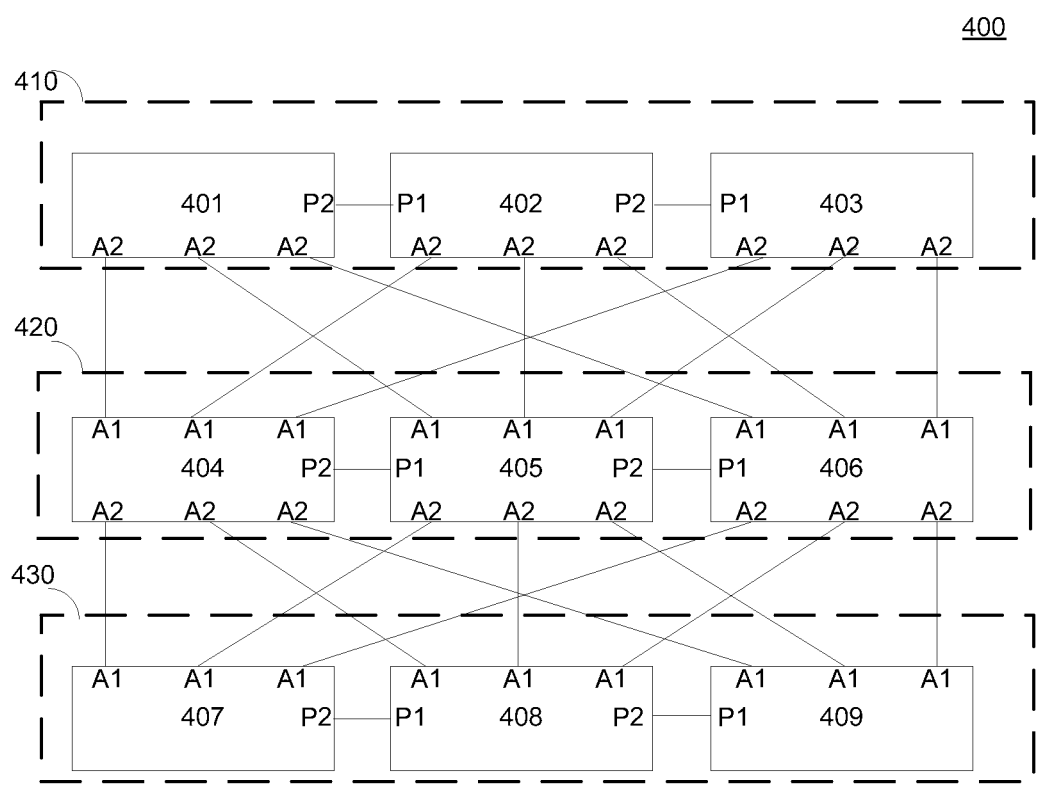
FIG. 4 is a schematic diagram illustrating a stacked switches system, according to an example of the present disclosure.

With reference to a stacked switches system 400 as shown in FIG. 4, in a stack group 410, a neighbor of switch 401 is the switch 402, neighbors of switch 402 are the switches 401 and 403, and a neighbor of the switch 403 is the switch 402. A second intra-group stack port P2 of the switch 401 may be connected with a first intra-group stack port P1 of the switch 402 via a stacking link. A second intra-group stack port P2 of the switch 402 may be connected with the a first intra-group stack port P1 of the switch 403 via a stacking link. Based on the same mode, the switches 404, 405, and 406 may be connected, using stacking links, to form a stack group 420. The switches 407, 408, and 409 may be connected to form a stack group 430.

A neighbor stack group of the stack group 410 is the stack group 420. Neighbor stack groups of the stack group 420 are the stack groups 410 and 430. A neighbor stack group of the stack group 430 is the stack group 420.

Each of the switches 401, 402, and 403 may include three second inter-group stack ports A2. Each of the switches 404, 405, and 406 may include three first inter-group stack ports A1 and three second inter-group stack ports A2. Each of the switches 407, 408, and 409 in the stack group 430 may include three first inter-group stack ports A1.

Three second inter-group stack ports A2 on the switch 401 may respectively be connected with a first inter-group stack port A1 on each of the switches 404, 405, and 406. Three second inter-group stack ports A2 on the switch 402 may respectively be connected with a first inter-group stack port A1 on each of the switches 404, 405, and 406. Three second inter-group stack ports A2 on the switch 403 may respectively be connected with a first inter-group stack port A1 on each of the switches 404, 405, and 406.

Three second inter-group stack ports A2 on the switch 404 may respectively be connected with a first inter-group stack port A1 on each of the switches 407, 408, and 409. Three second inter-group stack ports A2 on the switch 405 may respectively be connected with a first inter-group stack port A1 on each of the switches 407, 408, and 409. Three second inter-group stack ports A2 on the switch 406 may respectively be connected with a first inter-group stack port A1 on each of the switches 407, 408, and 409.

Taking the stack group 410 in FIG. 4 as an example, the switch 401 may send, through its intra-group stack port P2, stacking information of the switch 401 which may at least include topology information of the switch 401, and valid inter-group stack ports having an identifier A2 on the switch 401. The switch 402 may send, through its intra-group stack ports P1 and P2, stacking information of the switch 402 which may at least include topology information of the switch 402 and valid inter-group stack ports having identifiers A1 and A2 on the switch 402. The switch 403 may send, through its intra-group stack port P1, stacking information of the switch 403 which may at least include topology information of the switch 403, and valid inter-group stack ports having an identifier A1 on the switch 403.

The mode for the switches 401-409 collecting the stacking information of all member devices in the same stack group in the stacked switches system 400 shown in FIG. 4 may be the same as another mode, which is used for collecting the stacking information of all member devices in the same stack group in the stacked switches system 300 shown in FIG. 3.

Stacking links connected with the second inter-group stack ports A2 of the switches 401, 402, and 403 may be bound with a second aggregated stacking link group of the stack group 410. Stacking links connected with the first inter-group stack ports A1 of the switches 404, 405, and 406 may be bound with a first aggregated stacking link group of the stack group 420. Stacking links connected with the second inter-group stack ports A2 of the switches 404, 405, and 406 may be bound with a second aggregated stacking link group of the stack group 420. Stacking links connected with the first inter-group stack ports A1 of the switches 407, 408, and 409 may be bound with a first aggregated stacking link group of the stack group 430.

The switches 401, 402, and 403 may elect the switch 401 as the master device of the stack group 410, the switches 404-406 may elect the switch 404 as a master device of the stack group 420, and the switches 404-406 may elect the switch 407 as a master device of the stack group 430.

The switch 401 may select, based on a local first principle, one of its inter-group stack ports A2 as a member port of the second aggregated stacking link group of the stack group 410. The switch 401 may send, through the selected member port A2, stacking information of the stack group 410 to the neighbor stack group 420.

The switch 404 may select, based on the local first principle, one of its inter-group stack ports A1 as a member port of the first aggregated stacking link group and one of its inter-group stack ports A2 as a member port of the second aggregated stacking link group of the stack group 420. The switch 404 may send, through the selected member port A1, stacking information of the stack group 420 to the neighbor stack group 410. The switch 404 may send, through the selected member port A2, stacking information of the stack group 420 to the neighbor stack group 430.

The switch 407 may select, based on the local first principle, one of its inter-group stack ports A1 as a member port of the first aggregated stacking link group of the stack group 430. The switch 407 may send, through the member port selected A1, stacking information of the stack group 430 to the neighbor stack group 420.

The switch 401, may receive, through the second aggregated stacking link group of the stack group 410, the stacking information sent from the stack group 420. The received stacking information may include stacking information of the stack groups 420 and 430, in which stacking information of the stack group 430 includes just one aggregated stacking link group. As such, the switch 401 may determine that the stacked switches system completes the topology convergence. The switch 401 may determine, based on the stacking information of all of stack groups in the stacked switches system, that a physical topology of the stacked switches system is a matrix topology.

The switch 404 may receive, through the first aggregated stacking link group of the stack group 420, the stacking information sent from the switch 401. The switch 404 may also receive, through the second aggregated stacking link group of the stack group 420, the stacking information sent from the switch 407 that is the master device of the stack group 430. The switch 404 may compare the stacking information received through the first aggregated stacking link group and the stacking information received through the second aggregated stacking link group. In response to determining that the stacking information received through the first aggregated stacking link group includes stacking information of the stack group 410 which includes just one aggregated stacking link group and the stacking information received through the second aggregated stacking link group includes stacking information of the stack group 430 which includes just one aggregated stacking link group, the switch 404 may determine that the stacked switches system completes the topology convergence. The switch 404 may determine, based on the stacking information of all of stack groups in the stacked switches system, that the physical topology of the stacked switches system is the matrix topology.

The switch 407 may receive, through the first aggregated stacking link group of the stack group 430, the stacking information sent from the switch 404. The received stacking information may include stacking information of the stack groups 420 and 410, in which stacking information of the stack group 410 includes just one aggregated stacking link group. As such, the switch 407 may determine that the stacked switches system completes the topology convergence. The switch 407 may determine, based on the stacking information of all of stack groups in the stacked switches system, that the physical topology of the stacked switches system is the matrix topology.

According to an example of the present disclosure, the mode for the switches 401, 404, and 407 determine that the whole stacked switches system completes the topology convergence in the stacked switches system 400 shown in FIG. 4 may be the same as another mode, which is used for determining that the whole stacked switches system completes the topology convergence in the stacked switches system 300 shown in FIG. 3.

A Fourth Example

Figure 5:
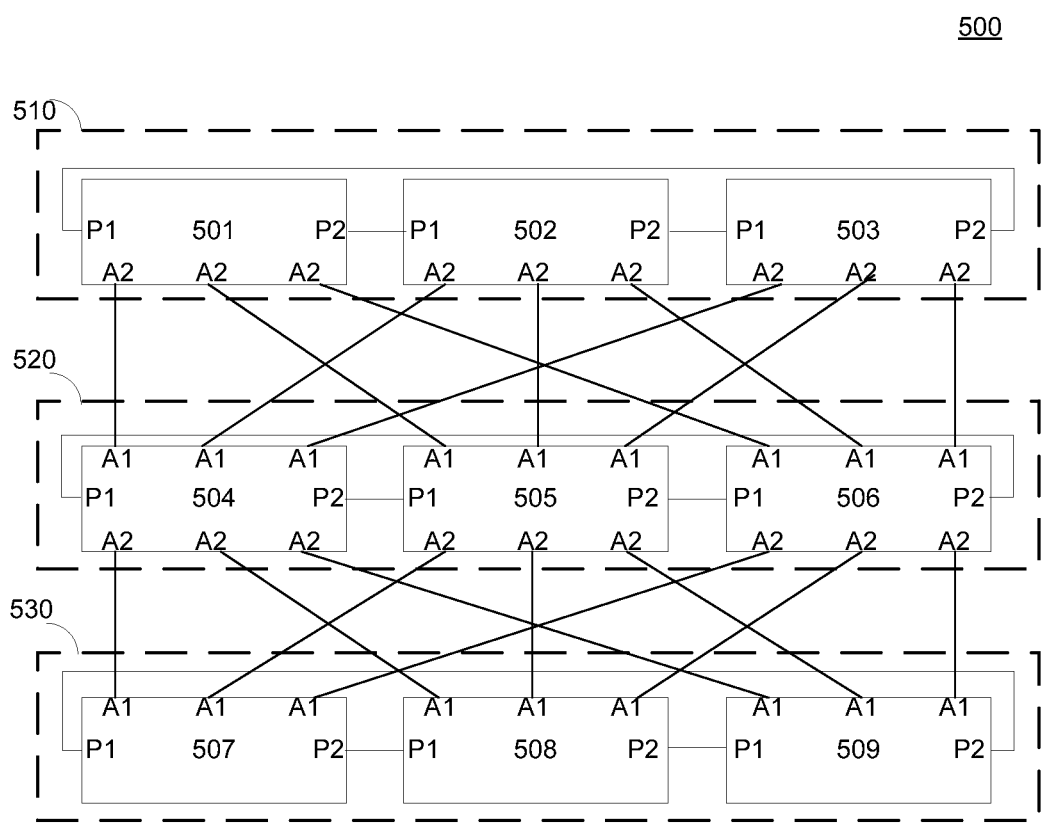
FIG. 5 is a schematic diagram illustrating a stacked switches system, according to an example of the present disclosure.

With reference to a stacked switches system 500 as shown in FIG. 5, The mode for connecting intra-group stack ports of switches in the stacked switches system 500 shown in FIG. 5 may be the same as another mode, which is used for connecting intra-group stack ports of switches in the stacked switches system 300 shown in FIG. 3.

The switches 501 to the switch 503 may respectively include three second inter-group stack ports A2. The switches 504 to the switch 506 may respectively include three first inter-group stack ports A1 and three second inter-group stack ports A2. The switches 507 to 509 may respectively include three first inter-group stack ports A1.

The inter-group stack ports of switches in the stacked switches system 500 as shown in FIG. 5 may be connected according to a way which is the same as that of the stacked switches system 400 as shown in FIG. 4.

According to an example of the present disclosure, a switch in each of the stack groups 510 to 530 may use the ring stacking topology discovery mode as described in the aforementioned examples to collect stacking information of other switches in a stack group to which the switch belongs as well as identifiers and states of other switches in the stack group, which are not repeated herein.

According to another example of the present disclosure, the switch in each of the stack groups 510 to 530 may collect the stacking information of other switches in the stack group to which the switch belongs as well as the identifiers and the states of other switches in the stack group according to a way described as follows.

The switch 501 may send, through its intra-group stack ports P1 and P2, the stacking information of the switch 501. Stacking information of the switch 501 may at least include topology information of the switch 501 in which a hop count is 0, and valid inter-group stack ports having an identifier A2 on the switch 501.

The switch 502 may send, through its intra-group stack ports P1 and P2, stacking information of the switch 502. Stacking information of the switch 502 may at least include topology information of the switch 502 in which a hop count is 0, and valid inter-group stack ports having an identifier A2 on the switch 502.

The switch 503 may send, through its intra-group stack ports P1 and P2, stacking information of the switch 503. Stacking information of the switch 503 may at least include topology information of the switch 503 in which a hop count is 0, and valid inter-group stack ports having an identifier A2 on the switch 503.

The switch 501 may receive, through its intra-group stack port P1, stacking information of the switch 503 in which the hop count is 0. The switch 501 may increase the hop count in the switch 503 by 1 (i.e., the hop count of the switch 503 is changed to 1). The switch 501 may add its stacking information to stacking information of the switch 501, and send stacking information of the switches 503 and 501 to the neighbor switch 502 through intra-group stack port P2. In this case, the stacking information sent by the switch 501 includes stacking information of the switch 503 in which the hop count is 1, and stacking information of the switch 501 in which the hop count is 0.

The switch 501 may receive, through its intra-group stack port P2, stacking information of the switch 502 in which the hop count is 0. The switch 501 may increase the hop count in the stacking information of switch 502 by 1. The switch 501 may add stacking information of the switch 502 to stacking information of the switch 502, and send stacking information of the switches 502 and 501 to the neighbor switch 503 through its intra-group stack port P1. In this case, the stacking information sent by the switch 501 include stacking information of the switch 502 in which the hop count is 1 and stacking information of the switch 501 in which the hop count is 0.

The switch 501 may compare two sets of stacking information respectively received through its intra-group stack ports P1 and P2, find that two sets of stacking information respectively are originated from the switch 503 and the switch 502. As such, the switch 501 may determine that the stack group 510 does not complete topology convergence. The switches 502 and the switch 503 may use the same way as described above to process the stacking information, and to determine that the stack group 510 does not complete the topology convergence, which are not repeated herein.

The switch 501 may continue to receive, through its intra-group stack port P1, stacking information of the switches 502 and 503. The switch 501 may increase the hop count in each of stacking information of the switches 502 and 503 by 1 (i.e., the hop count in stacking information of the switch 502 is changed to 2 and the hop count in the stacking information of the switch 503 is changed to 1). The switch 501 may add stacking information of the switch 501 to stacking information of the switches 502 and 503, and may send stacking information of the switches 502, 503 and 501 to the neighbor switch 502 through its intra-group stack port P2. In this case, the stacking information sent by the switch 501 may include stacking information of the switch 502 in which the hop count is 2, stacking information of the switch 503 in which the hop count is 1, and stacking information of the switch 501 in which the hop count is 0.

The switch 501 may continue to receive, through its intra-group stack port P2, the stacking information from the switch 502, which may include stacking information of the switch 503 in which the hop count is 1, and stacking information of the switch 502 in which the hop count is 0. The switch 501 may increase the hop count in each of stacking information of the switches 503 and 502 by 1. The switch 501 may add the stacking information of the switch to stacking information of the switches 503 and 502, and send the stacking information to the neighbor switch 503 through its intra-group stack port P1. In this case, the stacking information sent by the switch 501 may include stacking information of the switch 503 in which the hop count is 2, stacking information of the switch 502 in which the hop count is 1, and stacking information of the switch 501 in which the hop count is 0.

The switch 501 may compare two sets of stacking information respectively received through its intra-group stack port P1 and P2, and find that two sets of stacking information respectively are originated from the switch 502 and the switch 503. As such, the switch 501 may determine that the stack group 510 does not complete the topology convergence. Each of the switches 502 and the switch 503 may use the same way as described above to process the stacking information received through the intra-group stack port on each of the switches 502 and the switch 503, and to determine that the stack group 510 does not complete the topology convergence, which are not repeated herein.

The switch 501 may continue to receive, through its intra-group stack port P1, stacking information from the switch 503, which may include stacking information of the switch 501 in which the hop count is 2, stacking information of the switch 502 in which the hop count is 1, and stacking information of the switch 503 in which the hop count is 0. The switch 501 may continue to receive, through its intra-group stack port P2, the stacking information from the switch 502, which may include stacking information of the switch 501 in which the hop count is 2, stacking information of the switch 503 in which the hop count is 1, and stacking information of the switch 502 in which the hop count is 0. The switch 501 may compare two sets of stacking information respectively received through P1 and P2 on the switch 501, find that two sets of stacking information are originated from the switch 501 and include stacking information of the same member devices (stacking information of the switches 501-503). The switch 501 may further find that the stacking information of each member device in the two sets of stacking information includes two intra-group stack ports P1 and P2. As such, the switch 501 may determine that the stack group 510 completes the topology convergence. The switch 501 may determine, based on the convergent topology of the stack group 510, that a physical topology of the stack group 510 is a ring topology. The way for determining, by the switches 502-503 in the stack group 510, that the physical topology of the stack group 510 is the ring topology may be the same as that of the switch 501, which is not repeated herein. The way for determining, by the switches 504-509 in the stack groups 520 and 530, that the physical topology of the stack groups 520 and 530 are the ring topology may be the same as that of the switch 501.

Stacking links connected with the second inter-group stack ports A2 of the switches 501, 502, and 503 may be bound with a second aggregated stacking link group of the stack group 510. Stacking links connected with the first inter-group stack ports A1 of the switches 504, 505, and 506 may be bound with a first aggregated stacking link group of the stack group 520. Stacking links connected with the second inter-group stack ports A2 of the switches 504, 505, and 506 may be bound with a second aggregated stacking link group of the stack group 520. Stacking links connected with the first inter-group stack ports A1 of the switches 507, 508, and 509 may be bound with a first aggregated stacking link group of the stack group 530.

The switches 501-503 may elect the switch 501 as a master device of the stack group 510, the switches 504-506 elect the switch 504 as a master device of the stack group 520, and the switches 507-509 elect the switch 507 as a master device of the stack group 530. The mode for the switches 501, 504 and 507 collecting the stacking information of all stack groups in the stacked switches system 500 shown in FIG. 5 may be the same as other modes, which are used for collecting the stacking information of all stack groups in the stacked switches system 300 shown in FIG. 3. When the master device of each stack group determines that the stacked switches system completes the topology convergence, the master device of each stack group may perform topology calculation based on the collected stacking information of all of stack groups in the stacked switches system, identify that the member devices in the stacked switches system form matrix connections, and determine that a physical topology of the stacked switches system is a matrix topology.

A Fifth Example

Figure 6:
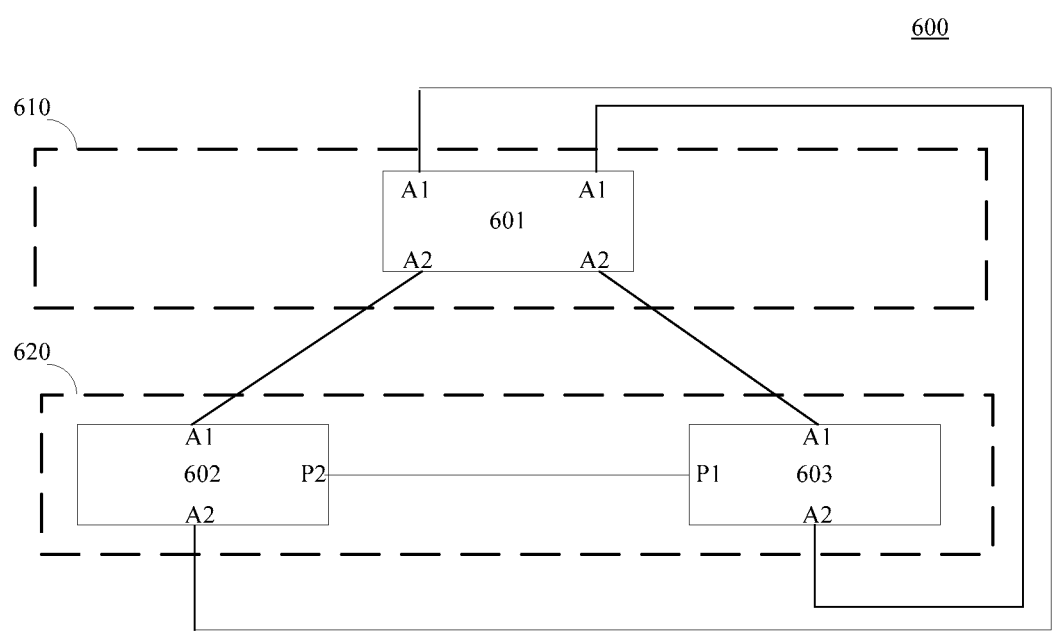
FIG. 6 is a schematic diagram illustrating a stacked switches system, according to an example of the present disclosure.

With reference to a stacked switches system 600 as shown in FIG. 6, a stack group 610 may possess one switch 601. A second intra-group stack port P2 of switch 602 may be connected with a first intra-group stack port P1 of switch 603 via a stacking link.

Two first inter-group stack ports A1 of the switch 601 may respectively be connected, using two stacking links, with the second inter-group stack port A2 of the switches 602 and 603. Two second inter-group stack ports A2 of the switch 601 may respectively be connected, using two stacking links, with the first inter-group stack port A1 of the switches 602 and 603.

As shown in FIG. 6, the stack group 610 only includes the switch 601. When an intra-group stack port such as P1 or P2 is configured on the switch 601 and a configured period of time for collecting the topology is expired, the switch 601 may determine that the stack group 610 completes the topology convergence. When the intra-group stack port such as P1 or P2 is not configured on the switch 601, the switch 601 may, by default, not collect the stacking information within the stack group 610 and determine that the stack group 610 completes the topology convergence.

When the switch 601 in the stack group 610 determines that the topology within the stack group 610 is convergent, the switch 601 may elect the switch 601 as a master device of the stack group 610. By default, the switch 601 may configure the inter-group stack port A1 as a first aggregated stacking link group of the stack group 610 and the inter-group stack port A2 as a second aggregated stacking link group of the stack group 610.

The switches 602 and 603 in the stack group 620 may use modes as described in the aforementioned examples in FIGS. 3 and 4 to collect stacking information of all of other switches in the stack group 620 and to determine that the stack group 620 completes the topology convergence.

The switch 602 and the switch 603, may bind all of inter-group stack ports A1 of the switch 602 and the switch 603 that are in a working state with a first aggregated stacking link group of the stack group 620, and may bind all of inter-group stack ports A2 of the switch 602 and the switch 603 that are in the working state with a second aggregated stacking link group of the stack group 620.

The switches 602 and 603 may elect the switch 602 as a master device of the stack group 620.

The switch 601, as the master device of the stack group 610, and the switch 602, as the master device of the stack group 620, may use modes as described in the aforementioned examples in FIGS. 3 and 4 to collect stacking information of another stack group in the stacked switches system.

The switch 601 that is the master device of the stack group 610 and the switch 602 that is the master device of the stack group 620 determine that the stacked switches system completes the topology convergence, the master device of each of the stack groups 610 and 620 may perform topology calculation based on the collected stacking information of all of stack groups in the stacked switches system, identify that the member devices in the stacked switches system form approximate matrix connections, and determine that a physical topology of the stacked switches system is an approximate matrix topology. Thereafter, the switches 601 and the switch 602 may elect the stack group 620 as a master stack group of the stacked switches system. As such, the master device of the stack group 620 such as the switch 602 may be the master device of the stacked switches system, in which the switch 602 may manage the whole stacked switches system 600.

In the various examples as described above, when a member device in a stack group collects stacking information of all members in its stack group, the member device may send its topology information. In this case, topology information that is included in stacking information of the member device and used for electing a master device of the stack group may at least include a priority of the member device, running time of the member device, a media access control (MAC) address of a central processing unit (CPU), and a role of the member device in the stack group.

According to an example of the present disclosure, initially, states of all of member devices in a stack group may be either an initial state or a Wait_Master state. In other words, all member devices may not serve any role within the stack group by default.

The member devices in one stack group may elect a master device of the stack group based on a predetermined election rule and information about all member devices in the stack group. For example, when the states of all member devices are the initial states or the Wait_Master states, the member devices may elect a member device with the highest priority or the lowest priority as the master device of their stack group. Alternatively, the member devices may elect a member device with the longest system running time or the shortest system running time as the master device of their stack group. Alternatively, the member devices may elect a member device with a minimum MAC address or a maximum MAC address as the master device of their stack group. Examples of the present disclosure may not limit herein. According to an example of the present disclosure, one member device may be elected as the master device within each stack group.

According to an example of the present disclosure, when the roles served by the member devices in the stack group are predetermined initially, the member devices in the stack group may elect a predetermined master device as the master device of their stack group.

According to an example of the present disclosure, when the topology of the stack group is changed, the roles served by the member devices in the stack group may depend on a master device or a slave device in the stack group that is determined by a previous election.

In the examples as described above, when a master device of one stack group collects stacking information of other stack groups, information that is included in stacking information of the stack group for electing a master stack group may at least include its priority, running time, and the MAC address of the CPU.

Master devices in each stack groups in the stacked switches system may elect the master stack group of the stacked switches system based on a predetermined election rule and information about all of other stack groups. For example, a stack group of which a master device has the highest priority or the lowest priority may be elected as the master stack group of the stacked switches system. Alternatively, a stack group of which a master device has the longest system running time or the shortest system running time may be elected as the master stack group of the stacked switches system. Alternatively, a stack group of which a master device has a minimum MAC address or a maximum MAC address may be elected as the master stack group of the stacked switches system. Examples of the present disclosure may not limit herein. According to an example of the present disclosure, one stack group may be elected as the master stack group of the whole stacked switches system.

According to an example of the present disclosure, when the roles served by the stack groups in the stacked switches system are predetermined initially, the master devices of the stack groups in the stacked switches system may elect a predetermined stack group as the master stack group of the stacked switches system.

According to an example of the present disclosure, when the topology of the stacked switches system is changed, the role served by the master stack group in the stacked switches system may depend on a master stack group or a backup stack group that is determined by a previous election.

According to various examples of the present disclosure, when the topology of the stacked switches system is convergent, the stacking information within the stack group and the stacking information between the stack groups may be updated. In this case, the updating of the stacking information within the stack group and the updating of the stacking information between the stack groups are independent of each other.

Figure 7A:
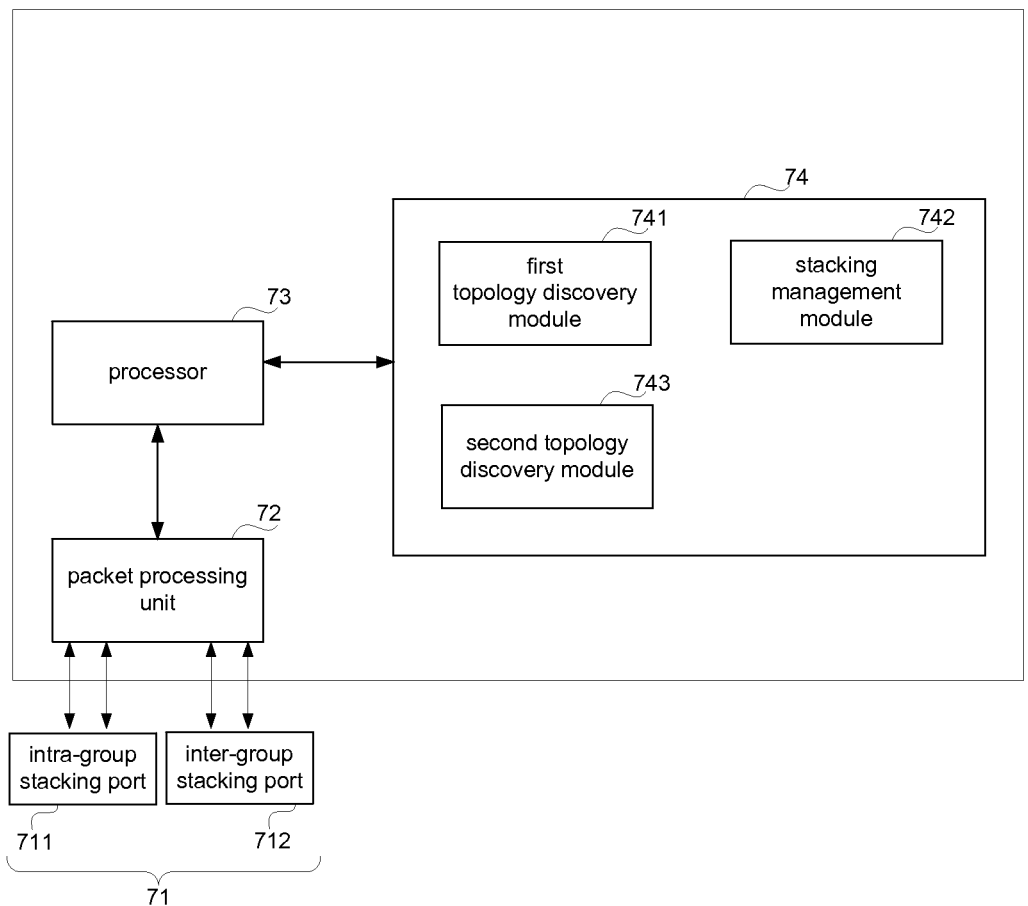
FIG. 7A is a schematic diagram illustrating a hardware structure of a topology discovery apparatus, according to an example of the present disclosure.

FIG. 7A is a schematic diagram illustrating a of a topology discovery device, applied to an apparatus serving as a member device in a stack group of a stacked switches system, according to an example of the present disclosure. The stacked switches system may include at least two stack groups and a plurality of member devices, in which the number of the member devices is greater than the number of the stack groups. As shown in FIG. 7A, the device may include ports 71, a packet processing unit 72 such a forwarding chip, a processor 73, and a storage 74. The ports 71 may include an intra-group stack port 711 and an inter-group stack port 712. The packet processing unit 72 may transmit information (messages) received via the ports 71 to the processor 73 for processing, and may transmit information (messages) from the processor 73 to the ports 71 for transmitting. The storage 74 may include machine-readable instruction modules to be executed by the processor 73, in which the machine-readable instruction modules may include a first topology discovery module 741, a stacking management module 742, and a second topology discovery module 743.

The first topology discovery module 741 may collect stacking information of all member devices in a first stack group which the device belongs to. The first topology discovery module 741 may identify a physical topology of the first stack group, such as a ring topology or a chain topology, based on the stacking information of all member devices in the first stack group.

The stacking management module 742 may bind, based on the stacking information of all member devices in the first stack group, all inter-group stack ports sharing an identical identifier in the first stack group with an aggregated stacking link group of the first stack group.

The second topology discovery module 743 may collect stacking information of all stack groups. The second topology discovery module 743 may identify, based on the stacking information of all stack groups, a physical topology of the stacked switches system, such as a matrix topology or an approximate matrix topology.

According to an example of the present disclosure, the first topology discovery module 741 may send stacking information of the first stack group through the intra-group stack port 711; and may receive stacking information of another member device in the first stack group through the intra-group stack port 711.

According to an example of the present disclosure, the first topology discovery module 741 may send stacking information of the first stack group through a first intra-group stack port and a second intra-group stack port of the device which are belongs to the intra-group stack port 711. The first topology discovery module 741 may receive stacking information of other member devices in the first stack group through the first intra-group stack port and the second intra-group stack port; add stacking information of the first stack group to the stacking information received through the first intra-group stack port to form a first combined stacking information, and send the first combined stacking information through the second intra-group stack port. The first topology discovery module 741 may receive stacking information of other member devices in the first stack group through the second intra-group stack port, add stacking information of the device to the stacking information received through the second intra-group stack port to form a second combined stacking information, and send the second combined stacking information through the first intra-group stack port.

According to an example of the present disclosure, the first topology discovery module 741 may send stacking information of the device through the first intra-group stack port and second intra-group stack port of the device. The first topology discovery module 741 may receive stacking information of other member devices in the stack group through the first intra-group stack port, increase each hop count in stacking information received through the first intra-group stack port by 1; add stacking information of the first stack group to the stacking information received through the first intra-group stack port to form a third combined stacking information; and send the third combined stack information through the second intra-group stack port. The first topology discovery module 741 may receive stacking information of other member devices through the second intra-group stack port; increase each hop count in the stacking information received through the second intra-group stack port by 1; add stacking information of the device to the stacking information received through the second intra-group stack port to form a fourth combined stacking information; and send the fourth combined stacking information through the first intra-group stack port.

According to an example of the present disclosure, the second topology discovery module 743 may send stacking information of the first stack group through the aggregated stacking link group; and receive stacking information of another stack group in the stacked switches system through the aggregated stacking link group.

According to an example of the present disclosure, The inter-group stack port 712 may include a first inter-group stack port and a second inter-group stack port. The stacking management module 742 may bind first inter-group stack ports of all member devices in the first stack group with a first aggregated stacking link group of the first stack group; and bind second inter-group stack ports of all member devices in the first stack group with a second aggregated stacking link group of the first stack group.

According to an example of the present disclosure, the second topology discovery module 743 may send the stacking information of the first stack group through the first aggregated stacking link group and the second aggregated stacking link group. The second topology discovery module 743 may receive the stacking information of other stack groups in the stacked switches system through the first aggregated stacking link group, add the stacking information of the first stack group to the stacking information received through the first aggregated stacking link group to form a first piece of stacking information, and send the first piece of stacking information through the second aggregated stacking link group. The second topology discovery module 743 may receive the stacking information of other stack groups in the stacked switches system through the second aggregated stacking link group; add the stacking information of first stack group to the stacking information received through the second aggregated stacking link group to form a second piece of stacking information, and send the second piece of stacking information through the first aggregated stacking link group.

According to an example of the present disclosure, the second topology discovery module 743 may send the stacking information of the first stack group through the first aggregated stacking link group and the second aggregated stacking link group. The second topology discovery module 743 may receive the stacking information of other stack groups in the stacked switches system through the first aggregated stacking link group, increase each hop count in the stacking information received through the first aggregated stacking link group by 1, add stacking information of the first stack group to the stacking information received through the first aggregated stacking link group to form a third piece of stacking information, and send the third piece of stacking information through the second aggregated stacking link group. The second topology discovery module 743 may receive the stacking information of other stack groups in the stacked switches system through the second aggregated stacking link group, and increase each hop count in the stacking information being received through the second aggregated stacking link group by 1, add the stacking information of the first stack group received through the second aggregated stacking link group to form a fourth piece of stacking information, and send the fourth piece of stacking information through the first aggregated stacking link group.

Figure 7B:
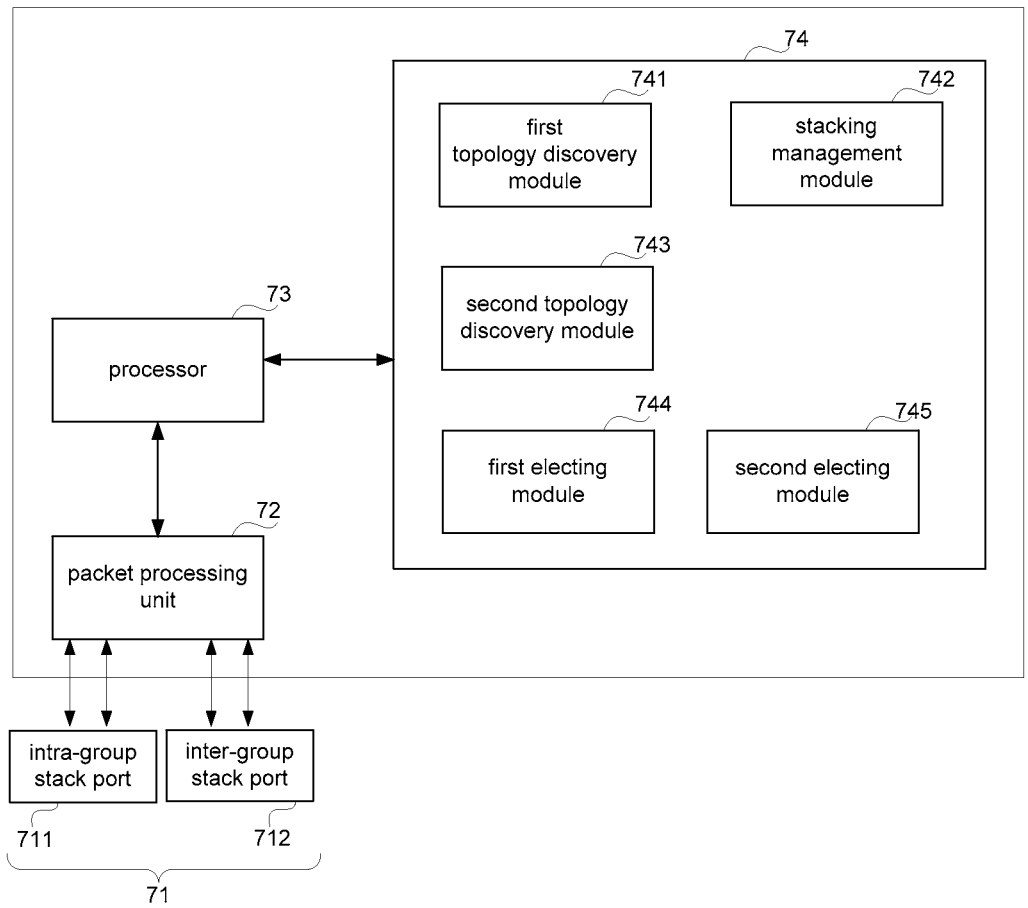
FIG. 7B is a schematic diagram illustrating a hardware structure of a topology discovery apparatus, according to another example of the present disclosure.

According to an example of the present disclosure, the apparatus may further include a first electing module 744, configured to elect a master device of the stack group based on the collected stacking information of all member devices in the first stack group. The apparatus may further include a second electing module 745, configured to elect a master stack group of the stacked switches system based on the collected stacking information of the plurality stack groups. Therefore, an example of the hardware structure of the topology discovery apparatus is shown in FIG. 7B.

The above-mentioned modules in the examples of the present disclosure may be deployed either in a centralized or a distributed configuration; and may be either merged into a single module, or further split into a plurality of sub-modules.

As may be seen from the above descriptions, according to various examples of the present disclosure, stacking information within a stack group is collected first. Then, a master device of the stack group is elected. The master device represents the stack group to collect stacking information between stack groups. As such, intra-group stacking information and inter-group stacking information is collected hierarchically. Therefore, stacking information of a stacked switches system can be quickly and accurately collected, and thus topology discovery can be achieved in the stacked switches system and the stacked switches system can be expanded.

Further, in various examples of the present disclosure, the updating of the stacking information within the stack group and the updating of the stacking information between the stack groups are independent of each other. The updating of the stacking information within the stack group cannot influence the topology of the whole stacked switches system. As such, the impacts on the whole stacked switches system resulting from stacking topology changes can be reduced.

The above examples may be implemented by hardware, software or firmware, or a combination thereof. For example, the various methods, processes and functional modules described herein may be implemented by a processor (the term processor is to be interpreted broadly to include a CPU, processing unit, ASIC, logic unit, or programmable gate matrix, etc.). The processes, methods, and functional modules disclosed herein may all be performed by a single processor or split between several processors. In addition, reference in this disclosure or the claims to a 'processor' should thus be interpreted to mean 'one or more processors'. The processes, methods and functional modules disclosed herein may be implemented as machine readable instructions executable by one or more processors, hardware logic circuitry of the one or more processors or a combination thereof. Further the examples disclosed herein may be implemented in the form of a computer software product. The computer software product may be stored in a non-transitory storage medium and may include a plurality of instructions for making a computer apparatus (which may be a personal computer, a server or a network apparatus such as a router, switch, access point, etc.) implement the method recited in the examples of the present disclosure.

All or part of the procedures of the methods of the above examples may be implemented by hardware modules following machine readable instructions. The machine readable instructions may be stored in a computer readable storage medium. When running, the machine readable instructions may provide the procedures of the method examples. The storage medium may be diskette, CD, ROM (Read-Only Memory) or RAM (Random Access Memory), and etc.

The figures are only illustrations of examples, in which the modules or procedures shown in the figures may not be necessarily essential for implementing the present disclosure. The modules in the aforesaid examples may be combined into one module or further divided into a plurality of sub-modules.

The above are several examples of the present disclosure, and are not used for limiting the protection scope of the present disclosure. Any modifications, equivalents, improvements, etc., made under the principle of the present disclosure should be included in the protection scope of the present disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method of topology discovery in a stacked switches system including a plurality of stack groups, wherein the method comprises:
   collecting, by a device serving as a member device of a first stack group of the plurality of stack groups in the stacked switches system, stacking information of all member devices in the first stack group;
   identifying, by the device, a physical topology of the first stack group based on the stacking information of all member devices in the first stack group;
   binding, by the device, based on the stacking information of all member devices in the first stack group, all inter-group stack ports sharing an identical identifier in the first stack group with an aggregated stacking link group;
   collecting, by the device, stacking information of a second stack group in the stacked switches system; and
   identifying, by the device based on the stacking information of the first and second stack groups in the stacked switches system, a physical topology of the stacked switches system.

2. The method of claim 1, wherein the operation of collecting the stacking information of all member devices in the first stack group comprises:
   sending, by the device, stacking information of the device through an intra-group stack port of the device; and
   receiving, by the device, stacking information of another member device in the first stack group through the intra-group stack port of the device.

3. The method of claim 1, wherein the operation of collecting the stacking information of all member devices in the first stack group comprises:
   sending, by the device, stacking information of the device through a first intra-group stack port and a second intra-group stack port of the device;
   receiving, by the device, stacking information of other member devices in the first stack group through the first intra-group stack port and the second intra-group stack port respectively;
   adding, by the device, the stacking information of the device to the stacking information received through the first intra-group stack port to form a first combined stacking information, and sending the first combined stacking information through the second intra-group stack port; and
   adding, by the device, the stacking information of the device to the stacking information received through the second intra-group stack port to form a second combined stacking information, and sending the second combined stacking information through the first intra-group stack port.

4. The method of claim 1, wherein the operation of collecting the stacking information of the first and second stack groups comprises:
   sending, by the device, stacking information of the first stack group through the aggregated stacking link group; and
   receiving, by the device, the stacking information of the second stack group in the stacked switches system through the aggregated stacking link group.

5. The method of claim 1, wherein the binding all inter-group stack ports further comprises:
   binding, by the device, first inter-group stack ports, sharing an identical identifier, of all the member devices in the first stack group with a first aggregated stacking link group of the first stack group; and
   binding, by the device, second inter-group stack ports, sharing another identical identifier, of all the member devices in the first stack group with a second aggregated stacking link group of the first stack group.

6. The method of claim 1, wherein the aggregated stacking link group comprises a first aggregated stacking link group and a second aggregated stacking link group, and
   wherein the operation of collecting the stacking information of the second stack group further comprises:
   sending, by the device, stacking information of the first stack group through the first aggregated stacking link group and the second aggregated stacking link group;
   receiving, by the device, stacking information of other stack groups in the stacked switches system through the first aggregated stacking link group and the second aggregated stacking link group respectively;
   adding, by the device, the stacking information of the first stack group to the stacking information received through the first aggregated stacking link group to form a first piece of stacking information, and sending the first piece of stacking information through the second aggregated stacking link group; and
   adding, by the device, the stacking information of the first stack group to the stacking information received through the second aggregated stacking link group to form a second piece of stacking information, and sending the second piece of stacking information through the first aggregated stacking link group.

7. The method of claim 1, wherein the aggregated stacking link group comprises a first aggregated stacking link group and a second aggregated stacking link group, and
wherein the operation of collecting the stacking information of the second stack group further comprises:
sending, by the device, stacking information of the first stack group through the first aggregated stacking link group and the second aggregated stacking link group;
receiving, by the device, stacking information of other stack groups in the stacked switches system through the first aggregated stacking link group and the second aggregated stacking link group respectively;
increasing, by the device, each hop count in the stacking information received through the first aggregated stacking link group by 1, adding the stacking information of the first stack group to the stacking information received through the first aggregated stacking link group to form a piece of stacking information, and sending the piece of stacking information through the second aggregated stacking link group; and
increasing, by the device, each hop count in the stacking information received through the second aggregated stacking link group by 1, adding the stacking information of the first stack group to stacking information received through the second aggregated stacking link group to form another piece of stacking information, and sending the another piece of stacking information through the first aggregated stacking link group.

8. The method of claim 1, further comprising:
electing, by the device, a master device of the first stack group based on the collected stacking information of all member devices in the first stack group; and
electing, by the device, a master stack group of the stacked switches system based on the collected stacking information.

9. An apparatus comprising a member device in a stack group of a stacked switches system, wherein the member device comprises:
at least one processor and a memory device storing instructions to be executed by the at least one processor;
the at least one processor configured to:
collect stacking information of all member devices in a first stack group which the device belongs to;
identify a physical topology of the first stack group based on the stacking information of all member devices in the first stack group;
bind, based on the stacking information of all member devices in the first stack group, all inter-group stack ports sharing an identical identifier in the first stack group with an aggregated stacking link group of the first stack group;
collect stacking information of a plurality of stack groups in the stacked switches system; and
identify, based on the stacking information of the plurality of stack groups, a physical topology of the stacked switches system.

10. The apparatus of claim 9, wherein the at least one processor is further configured to:
send stacking information of the member device through an intra-group stack port of the member device; and
receive stacking information of another member device in the first stack group through the intra-group stack port.

11. The apparatus of claim 10, wherein the at least one processor is further configured to:
elect a master device of the first stack group based on the collected stacking information of all member devices in the first stack group; and
elect a master stack group of the stacked switches system based on the collected stacking information of the plurality of stack groups.

12. The apparatus of claim 9, wherein the at least one processor is further configured to:
send stacking information of the member device through a first intra-group stack port and a second intra-group stack port of the member device;
receive stacking information of other member devices in the first stack group through the first intra-group stack port and the second intra-group stack port respectively;
add the stacking information of the member device to the stacking information received through the first intra-group stack port to form a first combined stacking information, and send the first combined stacking information through the second intra-group stack port; and
add the stacking information of the member device to the stacking information received through the second intra-group stack port to form a second combined stacking information, and send the second combined stacking information through the first intra-group stack port.

13. The apparatus of claim 9, wherein the at least one processor is further configured to:
send stacking information of the first stack group through the aggregated stacking link group; and
receive stacking information of another stack group in the stacked switches system through the aggregated stacking link group.

14. The apparatus of claim 9, wherein, when binding all inter-group stack ports, the at least one processor is further configured to:
bind first inter-group stack ports, sharing an identical identifier, of all the member devices in the first stack group with a first aggregated stacking link group of the first stack group; and
bind second inter-group stack ports, sharing another identical identifier, of all the member devices in the first stack group with a second aggregated stacking link group of stack group of the first stack group.

15. The apparatus of claim 9, wherein the aggregated stacking link group comprises a first aggregated stacking link group and a second aggregated stacking link group, and
wherein the at least one processor is further configured to:
send stacking information of the first stack group through the first aggregated stacking link group and the second aggregated stacking link group;
receive stacking information of other stack groups in the stacked switches system through the first aggregated stacking link group and the second aggregated stacking link group respectively;
add the stacking information of the first stack group to the stacking information received through the first aggregated stacking link group to form a first piece of stacking information, and send the first piece of stacking information through the second aggregated stacking link group; and
add the stacking information of the first stack group to the stacking information received through the second aggregated stacking link group to form a second piece of stacking information, and send the second piece of stacking information through the first aggregated stacking link group.

16. The apparatus of claim 9, wherein the aggregated stacking link group comprises a first aggregated stacking link group and a second aggregated stacking link group, and wherein the at least one processor is further configured to:
- send stacking information of the first stack group through the first aggregated stacking link group and the second aggregated stacking link group;
- receive stacking information of other stack groups in the stacked switches system through the first aggregated stacking link group and the second aggregated stacking link group respectively;
- increase each hop count in the stacking information received through the first aggregated stacking link group by 1, add the stacking information of the first stack group to the stacking information received through the first aggregated stacking link group to form a piece of stacking information, and send the piece of stacking information through the second aggregated stacking link group; and
- increase each hop count in the stacking information received through the second aggregated stacking link group by 1, add the stacking information of the first stack to the stacking information received through the second aggregated stacking link group to form another piece of stacking information, and send the another piece of stacking information through the first aggregated stacking link group.

\* \* \* \* \*